Aug. 29, 1967     E. K. BUYZE     3,338,339

FLOATING CALIPER SPOT DISK BRAKE STRUCTURE

Filed Feb. 18, 1966     2 Sheets-Sheet 1

INVENTOR.
EDWIN K. BUYZE
BY
ATTORNEY

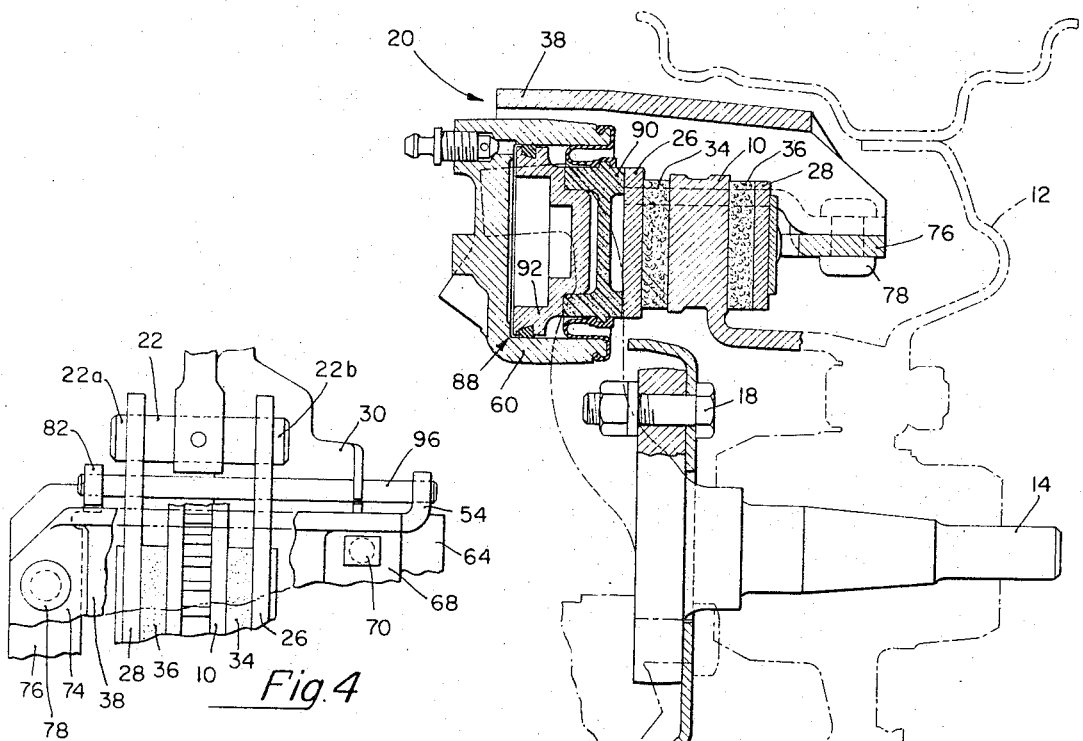
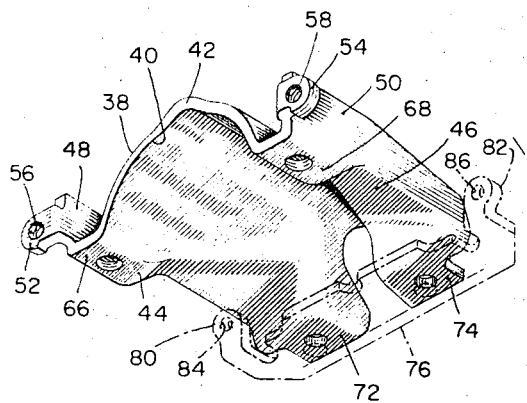
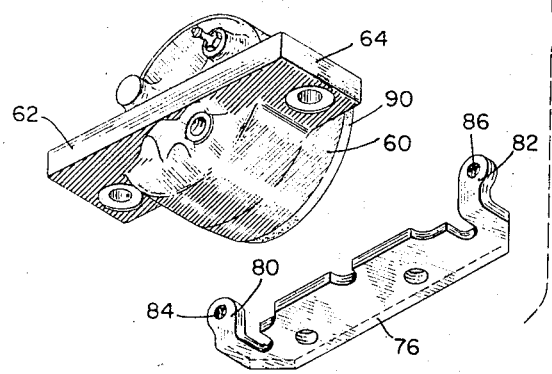

United States Patent Office 3,338,339
Patented Aug. 29, 1967

3,338,339
FLOATING CALIPER SPOT DISK BRAKE STRUCTURE
Edwin K. Buyze, St. Clair Shores, Mich., assignor to The Budd Company, Philadelphia, Pa., a corporation of Pennsylvania
Filed Feb. 18, 1966, Ser. No. 528,521
6 Claims. (Cl. 188—73)

ABSTRACT OF THE DISCLOSURE

A disk brake structure having a formed housing for reducing the weight of the housing and retaining the strength by forming the housing with an arch and adjacent channel section for acting as beams to supply the needed strength in the housing. An adapter plate is also provided for mounting about the spindle of a vehicle for ease of conversion from drum to disk brakes.

---

This invention relates to an improved disk brake structure and more particularly to a disk brake structure having a lighter improved housing and an adapter plate for attaching to a conventional wheel spindle for replacing conventional drum brakes with this improved disk brake structure. This invention is an improvement of co-pending patent application for Caliper-Type Disk Brake, U.S. Ser. No. 420,867 filed Dec. 24, 1964 now Patent No. 3,298,468.

Most common disk brake housing structures utilize an O or U shaped caliper for supporting the actuating means. Forces resulting from braking action in a U shaped caliper apply stresses which tend to open the branches of the caliper as though they were cantilever beams. Because of the stresses encountered, the housings, of necessity, are rather heavy and complex. In an O shaped housing, the forces of braking action stress the supporting sides as if they were fixed end beams and the tendency to spread opposing supporting sides is generally reduced, but the connecting ends of the housing are highly stressed. The O type housings are heavy, but less complex than the U shaped caliper housings.

Thus, it can be seen that because of the stress concentrations, the present housings for disk brake actuators must be relatively heavy and complex to accommodate the forces to which they are subjected. Such housings are expensive because of the amount of material used and the expensive manufacturing operations required to produce the housings.

It is an object of this invention to provide a disk brake structure having a novel arch shaped housing that can be easily fabricated from flat metal blanks as by a stamping or forging operation.

Another general object of the present invention is to provide an improved disk brake that has less complex structure and fewer parts, and is less expensive to manufacture than present structures.

Another problem encountered in replacing conventional drum brakes with disk brakes is the excessive rework required at the suspension, steering, and brake mounting structure and the limited space available for installing the brake structure. This invention has solved this problem by providing for individual adapter plates that can be secured to a particular conventional wheel spindles or knuckles, thus enabling easy conversion from drum brakes to disk brakes on any type vehicle for which an adapter plate is provided.

Another object of this invention is to provide an adaptor plate that can be easily designed to be mounted about the spindle of the wheel assembly of a particular vehicle for supporting the brake housing, actuator and brake pads about a portion of the brake disk secured to the wheel.

Another object of this invention is to provide a disk brake structure completely compatible with existing mechanical and hydraulic brake structures of standard automobiles having drum type brakes whereby during an automobile assembly operation, either a disk brake or drum brake may be installed on the vehicle, as desired. These and other objects and advantages of the present invention will become apparent as reference is had to the following specification and drawings wherein:

FIG. 3 is a view in the direction of the arrows, substantially along the line 3—3 of FIG. 1 illustrating the relative positions of the novel housing and adapter plate;

FIG. 4 is a view in the direction of the arrows substantially along the line 4—4 of FIG. 1, illustrating the manner in which the housing is supported on the brake shoes;

FIG. 5 is an exploded perspective view of the novel housing structure showing the axially extending arch and channel structure, the reinforcing hydraulic cylinder housing and thrust bar.

Figure 1:
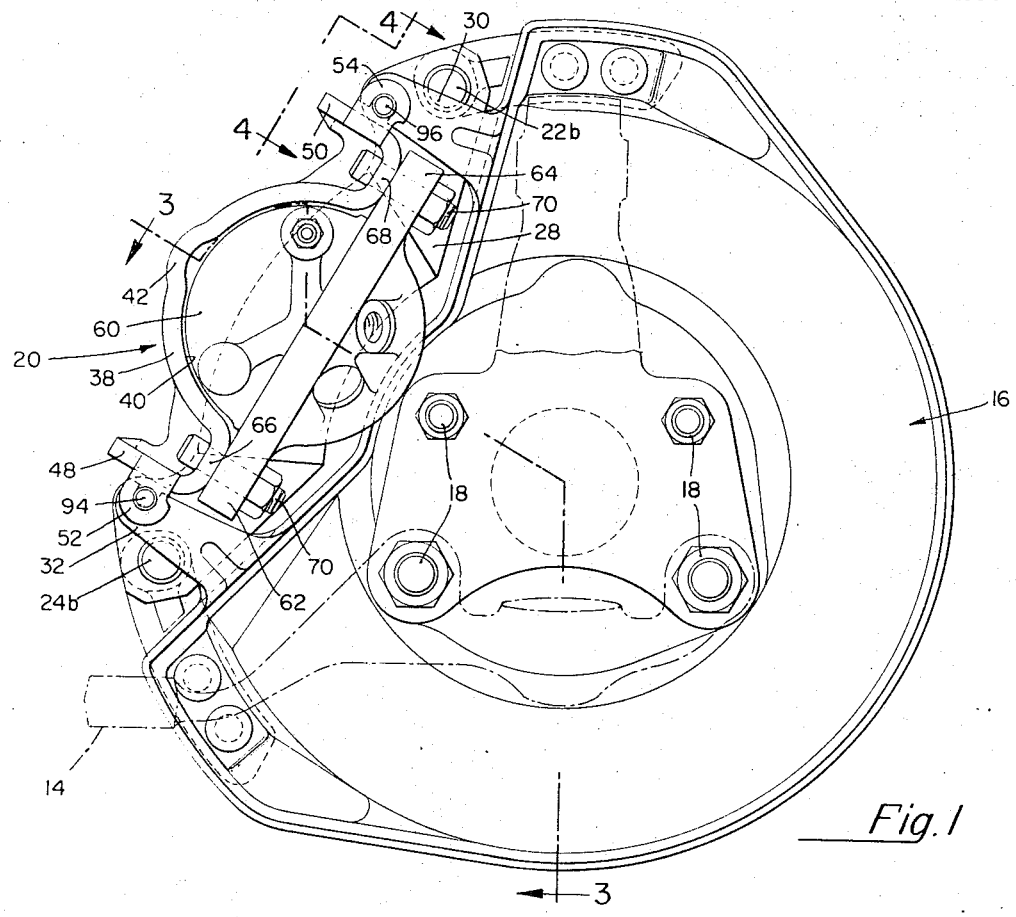
FIG. 1 is a side elevational view of the present invention mounted adjacent the spindle arm of a vehicle front wheel.

Referring now to the drawing, as best seen in FIGS. 1 and 3, a brake disk 10 is secured to a wheel 12 for rotation therewith on a spindle assembly 14 mounted on a vehicle (not shown). An adapter plate 16 is secured to the spindle assembly 14 by a plurality of bolts 18. A disk brake assembly, indicated generally by the numeral 20, is mounted on the adapter plate 16 about brake disk 10 for interaction therewith to accomplish braking action of the rotating wheel 12.

Figure 2:
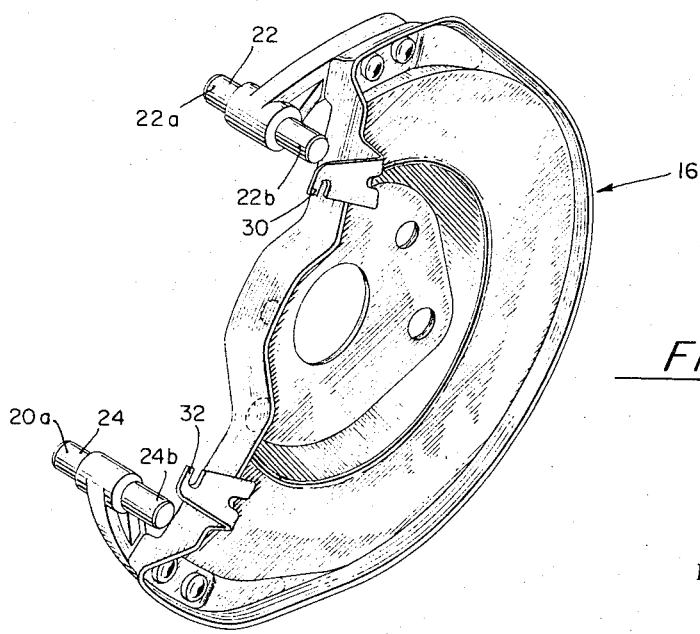
FIG. 2 is a perspective view of the novel adapter plate of the disk brake structure.

The adapter plate 16 as best seen in FIG. 2, includes a pair of mounting pins 22, 24 secured at their midpoints to the adapter plate and having end portions 22a, 22b and 24a, 24b respectively for supporting a pair of brake shoes 26, 28. Outboard stabilizers 30 and 32 are positioned on the adapter plate 16, one adjacent each mounting pin for a purpose to be explained later.

Referring to FIGS. 1 and 3, the disk brake assembly 20 includes the brake shoes 26, 28 with one of the shoes positioned on each side of the brake disk 10 and having their ends attached to the adapter plate 16 by the end portions 22a, 24a and 22b, 24b respectively of the mounting pins. Each brake shoe 26 and 28 has a pad 34, 36 respectively, secured thereto for engagement with the brake disk 10.

The novel assembly housing 37, as best seen in FIG. 5, includes a preformed plate 38 having an axially extending arch section 40 with a reinforcing rib 42 formed centrally thereon. Hat type web sections 44, 46 extend from each side of the arch 40 and terminate in axially and radially extending flanges 48, 50 respectively. Mounting tabs 52, 54 extend on one end at right angles to the plane of the respective flanges 48, 50 with apertures 56, 58 formed therein.

A hydraulic piston case 60 is positioned within the arch 40 and has a pair of arms 62, 64 which extend substantially parallel to opposing rim portions 66, 68 of the respective hat type web sections 44 and 46. The arms 62, 64 are secured to the respective rim portions 66, 68 by bolts 70 or other suitable means, for supporting the case 60 on the housing 38 and structurally reinforcing the plate. To the other rim portions 72, 74 of the hat sections 44, 46 a thrust bar 76 is secured as by rivets 78, or other suitable means. The thrust bar 76 has a pair of support tabs 80, 82 with apertures 84, 86 therein. The tabs 80, 82 are aligned with support tabs 52, 54 extending from the other end of housing 38.

As best seen in FIG. 3, a hydraulic piston 88 comprising an insulating end portion 90 and piston plate 92 is positioned in the case 60 for movement therein by application of pressure by hydraulic means in a conventional manner.

In the assembled position shown in FIGS. 1, 3 and 4, the brake shoes 26, 28 are supported on the pins 22, 24 of the adapter plate 16 for sliding axial movement into and from engagement with the brake disk 10. The housing 37 is slidably supported on the brake shoes 26, 28 by a pair of support pins 94, 96 which are supported in apertures formed in the brake shoes, as best seen in FIG. 4. The apertures 56, 84 are positioned about pin 94 and apertures 58, 86 are positioned about pin 96 whereby the housing may slide axially on the pins during movemen of the piston 88. The outboard stabilizers 30, 32 contact the respective pins 94, 96 and help support the added weight of the hydraulic piston supported on one end of the housing.

When the piston 88 is energized, brake shoe 26 and pad 34 are urged toward brake disk 10 until pad 34 contacts the disk and then further movement of the piston 88 causes the housing to slide axially on pins 94, 96. Such movement causes thrust bar 76 to contact brake shoe 28 and urge pad 36 into contact with the brake disk 10, thus placing pressure on both sides of brake disk 10 through pads 34 and 36.

Two forces are exerted on the brake shoes during a braking operation. The "drag forces" i.e., resultant forces imposed on the brake shoes parallel to the plane of rotation of the brake disk, will be transferred to the adapter plate from the brake shoes through the mounting pins 22 or 24, depending upon direction of rotation of the disk. The "clamping forces" i.e., forces normal to the plane of rotation of the disk, are taken by the housing 20. The arch and axially extending flanges resist the "clamping force" as a virtually straight line tension force tending to elongate the formed metal.

While prior art structures resisted such forces through a C or O section, the C sections have the arms of the C acting as cantilever beams to resist the clamping forces and the O sections, while providing more rigidity than the C section, react as fixed end beams, but have a stress concentration at the end connections. Therefore, it can be seen that the structure of this invention provides a more rigid housing member with less tendency to spread the supports for the contact points of the brake shoes during application of clamping force, thus reducing piston travel during braking operation. By reducing piston travel, more effective pedal travel is available during a brake operation. Further, by using a preformed metal housing expensive machining and multiplicity of parts is reduced to provide a less expensive housing.

While but one embodiment of the present invention has been shown and explained, it is obvious certain modifications may be made without departing from the scope and spirit of the following claims.

What is claimed is:

1. A housing member for a vehicle disk brake assembly having a brake disk secured to a vehicle wheel for movement therewith, a pair of brake shoes supported on a non-rotatable portion of the vehicle and positioned adjacent said brake disk for movement into engagement therewith, and an actuator for moving said brake shoes into engagement with said brake disk upon command, said housing member including a preformed plate of substantially uniform thickness, said plate extending axially transverse to said brake disk and including an axially extending arch section, a pair of axially and radially extended flanges, a web section on each side of said arch section for interconnecting said flanges substantially parallel to the axis of said arch section, a hydraulic piston case positioned within said arch along one edge of said plate and having an arm extending therefrom toward each of said flanges, each of said arms being secured to one of said web sections of said plate for supporting said piston case on said plate and for structurally reinforcing said housing member, a thrust bar extending between said flanges adjacent to the edge opposite the edge adjacent which said piston case is secured, said thrust bar being secured to said web sections of said plate for structurally reinforcing said housing, and mounting means for supporting said housing about a portion of said brake shoe.

2. The housing member as claimed in claim 1 having said web sections formed as hat type webs for allowing said housing to be mounted about said brake disk with said disk extending within the crown portion between the rim sections thereof.

3. The housing member as claimed in claim 1 wherein said arch section includes an axially extending integral rib for reinforcing said arch.

4. The housing member as claimed in claim 1 wherein said mounting means includes a pair of support pins mounted on said brake shoes, a pair of support tabs extending from opposed sides of said housing member and having apertures therein for receiving said support pins whereby said housing member is supported about said brake shoes and said brake disk.

5. The housing member as claimed in claim 4 including a hydraulic piston mounted in said piston case for reciprocal movement therein, hydraulic operating means operably connected to said piston case for moving said piston toward said brake disk on command, one end of said piston contacting one of said brake shoes, and said thrust bar contacting the other of said brake shoes whereby said brake shoes are brought into contact with said brake disk upon movement of said piston.

6. In a vehicle brake assembly a brake disk secured to a vehicle wheel for movement therewith, an adapter plate secured to a non-rotatable portion of the vehicle adjacent said brake disk, brake shoes slidably mounted on said adapter plate adjacent each side of said brake disk for sliding movement axially into contact with said brake disk, a housing member, support means for slidably supporting said housing member on said brake shoes, said housing member including an axially extending housing plate having a central arch portion, an axially and radially extended flange interconnected by web sections on each side of said arch portion, an actuator contacting one of said brake shoes for moving said brake shoe into contact with said brake disk, an actuator support secured to each of said web sections along one edge of said plate for reinforcing said housing and supporting said actuator in contact with said one brake shoe, a thrust plate secured to said web sections along the other edge of said housing plate adjacent said other brake shoe, control means for actuating said actuator upon command, said actuator contacting said one brake shoe when actuated and sliding said one brake shoe into contact with said brake disk and upon further movement sliding said housing axially on said support means, such further movement of said housing causing said thrust plate to contact said other brake shoe and move said other brake shoe into contact with said brake disk whereby a braking force is applied to said wheel for resisting movement thereof.

References Cited

UNITED STATES PATENTS

| 3,279,564 | 10/1966 | Gancel | 188—73 |
| 3,298,468 | 1/1967 | Buyze | 188—73 |

MILTON BUCHLER, *Primary Examiner.*

G. E. HALVOSA, *Assistant Examiner.*